United States Patent
Patel et al.

(10) Patent No.: US 10,021,712 B2
(45) Date of Patent: Jul. 10, 2018

(54) TECHNIQUES FOR CONFIGURING REFERENCE SIGNALS IN LOW LATENTCY WIRELESS COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 15/294,453

(22) Filed: Oct. 14, 2016

(65) Prior Publication Data

US 2017/0230992 A1   Aug. 10, 2017

Related U.S. Application Data

(60) Provisional application No. 62/292,073, filed on Feb. 5, 2016.

(51) Int. Cl.
*H04W 72/12* (2009.01)
*H04B 7/0413* (2017.01)
(Continued)

(52) U.S. Cl.
CPC ...... *H04W 72/1231* (2013.01); *H04B 7/0413* (2013.01); *H04B 7/0626* (2013.01);
(Continued)

(58) Field of Classification Search
CPC ... H04B 7/0413; H04B 7/0626; H04L 5/0048; H04W 72/042; H04W 72/0453; H04W 72/046; H04W 72/1231; H04W 72/1268
(Continued)

(56) References Cited

U.S. PATENT DOCUMENTS 9,844,072 B2 * 12/2017 Chen .................. H04W 72/14
2014/0192740 A1 * 7/2014 Ekpenyong .......... H04L 5/0094
370/329
(Continued)

OTHER PUBLICATIONS

"3 Generation Partnership Project, Technical Specification Group Radio Access Network, Evolved Universal Terrestrial Radio Access (E-UTRA), Physical layer procedures (Release 13)", 3GPP Standard, 3gpp TS 36.213, 3rd Generation Partnership Project (3gpp), Mobile Competence Centre, 650, Route Des Lucioles, F-96921, Sophia-Antipolis, Cedex, France, vol. RAN WG1, No. V13.0.0, Jan. 5, 2016, pp. 7-224, XP051047450.
(Continued)

Primary Examiner — Stephen J Clawson
(74) Attorney, Agent, or Firm — Anthony R. Morris

(57) ABSTRACT

Various aspects described herein relate to determining a configuration of reference signal (RS) resources in wireless communications. A scheduling grant of resources can be received from an access point, wherein the scheduling grant indicates one or more parameters related to transmission locations of one or more RSs. RS resource locations can be determined for the one or more RSs based at least in part on the one or more parameters. The one or more RSs can be received over the RS resource locations allowing for decimation of the RSs in time and/or frequency.

28 Claims, 12 Drawing Sheets

(51) Int. Cl.
H04L 5/00 (2006.01)
H04B 7/06 (2006.01)
H04W 72/04 (2009.01)

(52) U.S. Cl.
CPC ......... *H04L 5/0048* (2013.01); *H04W 72/042* (2013.01); *H04W 72/046* (2013.01); *H04W 72/0453* (2013.01); *H04W 72/1268* (2013.01)

(58) Field of Classification Search
USPC ....................................................... 370/330
See application file for complete search history.

(56) References Cited

U.S. PATENT DOCUMENTS

| 2015/0326360 | A1* | 11/2015 | Malladi | H04L 5/0032 370/329 |
| 2017/0230992 | A1* | 8/2017 | Patel | H04W 72/1231 |
| 2017/0272214 | A1* | 9/2017 | Chen | H04L 5/0001 |
| 2017/0367110 | A1* | 12/2017 | Li et al. | H04W 72/1268 |

OTHER PUBLICATIONS

CATT., "System Analysis on TTI Shortening," Document for Discussion and Decision, 3GPP TSG RAN WG1 #83, Anaheim, CA, USA, Nov. 15-22, 2015, R1-156613, pp. 1-8, XP051039895, Retrieved from the Internet: URL: http://www.3gpp.org/ftp/ MeetingsSYNC/RAN1/Docs/ [retrieved on Nov. 15, 2014].

Interdigital Communications., "Support for Short TTIs and Processing Times in LTE," Document for Dicussion, Decision, 3GPP TSG-RAN WGI #83, Anaheim, USA, Tdoc R1-157136, Nov. 16-20, 2015, pp. 1-6, XP051003403, Retrieved from the Internet : URL: http://www.3gpp.org/ftp/MeetingsSYNC/RAN1/Docs/ [retrieved on Nov. 15, 2015].

International Search Report and Written Opinion—PCT/US2016/066209—ISA/EPO—dated Mar. 16, 2017 (16 total pages).

"3rd Generation Partnership Project; Technical Specification Group Radio Access Network; Evolved Universal Terrestrial Radio Access (E-UTRA); Multiplexing and Channel Coding," Release 13, 3GPP TS 36.212, V13.0.0, Dec. 2015, pp. 1-121, XP051047448 [Retrieved on Jan. 5, 2016].

"3rd Generation Partnership Project; Technical Specification Group Radio Access Network; Evolved Universal Terrestrial Radio Access (E-UTRA); Physical channels and modulation," Release 13, 3GPP TS 36.211, V13.0.0, Dec. 2015, pp. 1-141, XP051047447 [ retrieved on Jan. 5, 2016].

Qualcomm Incorporated., "On Physical Layer Aspects of Low Latency Operation," Document for Discussion and Decision, 3GPP TSG RAN WG1 #83, Anaheim, California, USA, Nov. 16-20, 2015, R1-157082, pp. 1-4, XP051003373, Retrieved from the Internet: URL: http://www.3gpp.org/ftp/SYNC/RAN1/Docs/ [retrieved on Nov. 15, 2015].

* cited by examiner

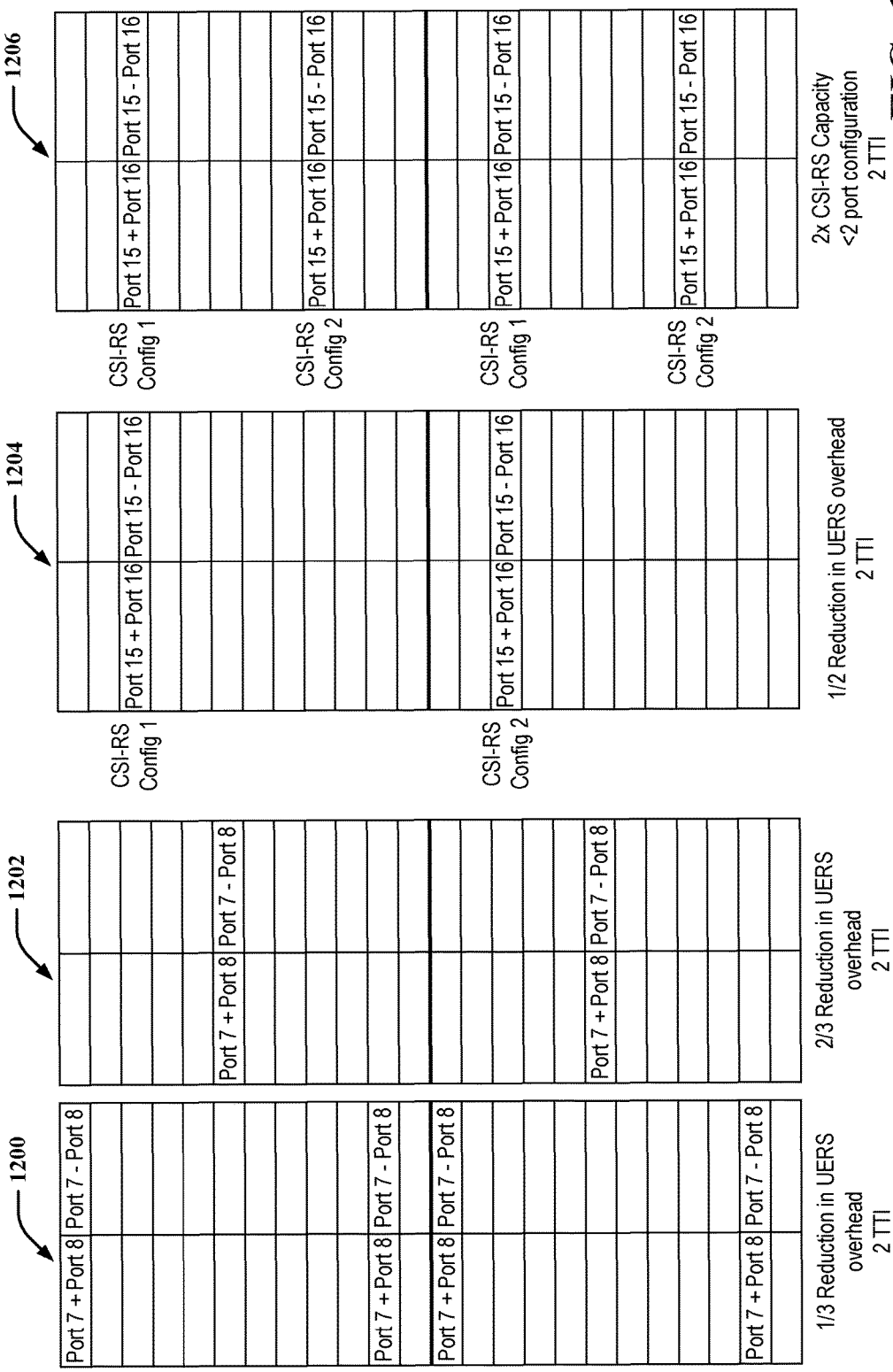

TECHNIQUES FOR CONFIGURING REFERENCE SIGNALS IN LOW LATENTCY WIRELESS COMMUNICATIONS

CLAIM OF PRIORITY UNDER 35 U.S.C. § 119

The present application for patent claims priority to Provisional Application No. 62/292,073 entitled "TECHNIQUES FOR CONFIGURING REFERENCE SIGNALS IN LOW LATENCY WIRELESS COMMUNICATIONS" filed Feb. 5, 2016, which is assigned to the assignee hereof and hereby expressly incorporated by reference herein for all purposes.

BACKGROUND

Described herein are aspects generally related to communication systems, and more particularly, to configuring reference signals is wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In LTE, some reference signals (RS), such as channel state information (CSI)-RS and user equipment (UE)-RS, may be scheduled for transmission in multiple symbols (e.g., orthogonal frequency division multiplexing (OFDM) symbols, single carrier frequency division multiplexing (SC-FDM) symbols, etc.) of a subframe, where the subframe is a 1 millisecond (ms) transmission time interval (TTI). Scheduling of the RSs may be based on a number of antenna ports corresponding to the RS transmission. In considering shorter duration TTIs for low latency communications (e.g., a symbol, two-symbol, slot, etc. TTI), using the same scheduling for CSI-RS, UE-RS, or other RSs per TTI may utilize more bandwidth than desired, which may lessen the performance advantages of selecting the shorter duration TTI.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for determining a configuration of reference signal (RS) resources in wireless communications is provided. The method includes receiving, from an access point, a scheduling grant of resources. The scheduling grant indicates one or more parameters related to transmission locations of one or more RSs. The method also includes determining RS resource locations for the one or more RSs based at least in part on the one or more parameters, and receiving the one or more RSs over the RS resource locations.

In another example, a method for specifying a configuration of resources for transmitting RSs in wireless communications is provided including generating a scheduling grant of resources for communicating with a user equipment (UE). The scheduling grant indicates one or more parameters related to communicating one or more RSs. The method further includes transmitting the scheduling grant to the UE, and transmitting the one or more RSs over RS resources based at least in part on the one or more parameters.

In further aspects, an apparatus for wireless communications is provided including a transceiver for communicating one or more wireless signals via one or more antennas, a memory configured to store instructions, and one or more processors communicatively coupled with the transceiver and the memory. The one or more processors are configured to receive, from an access point, a scheduling grant of resources, where the scheduling grant indicates one or more parameters related to transmission locations of one or more RSs, determine RS resource locations for the one or more RSs based at least in part on the one or more parameters, and receive the one or more RSs over the RS resource locations.

Also, in an aspect, an apparatus for wireless communications is provided including a transceiver for communicating one or more wireless signals via one or more antennas, a memory configured to store instructions, and one or more processors communicatively coupled with the transceiver and the memory. The one or more processors are configured to generate a scheduling grant of resources for communicating with a UE, where the scheduling grant indicates one or more parameters related to communicating one or more RSs, transmit the scheduling grant to the UE, and transmit the one or more RSs over RS resources based at least in part on the one or more parameters.

In an aspect, an apparatus for determining a configuration of RS resources in wireless communications is provided. The apparatus includes means for receiving, from an access point, a scheduling grant of resources. The scheduling grant indicates one or more parameters related to transmission locations of one or more RSs. The apparatus also includes means for determining RS resource locations for the one or more RSs based at least in part on the one or more parameters, and means for receiving the one or more RSs over the RS resource locations.

In another example, an apparatus for specifying a configuration of resources for transmitting RSs in wireless communications is provided including means generating a scheduling grant of resources for communicating with a UE. The scheduling grant indicates one or more parameters related to communicating one or more RSs. The apparatus further includes means for transmitting the scheduling grant to the UE, and means for transmitting the one or more RSs over RS resources based at least in part on the one or more parameters.

In an aspect, a computer-readable medium including computer-executable code for determining a configuration of RS resources in wireless communications is provided. The code includes code for receiving, from an access point, a scheduling grant of resources. The scheduling grant indicates one or more parameters related to transmission locations of one or more RSs. The code also includes code for determining RS resource locations for the one or more RSs based at least in part on the one or more parameters, and code for receiving the one or more RSs over the RS resource locations.

In another example, a computer-readable medium including computer-executable code for specifying a configuration of resources for transmitting RSs in wireless communications is provided including code generating a scheduling grant of resources for communicating with a UE. The scheduling grant indicates one or more parameters related to communicating one or more RSs. The code further includes code for transmitting the scheduling grant to the UE, and code for transmitting the one or more RSs over RS resources based at least in part on the one or more parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 12 is a diagram illustrating examples of RS frequency allocations in accordance with aspects described herein.

DETAILED DESCRIPTION

Figure 1:
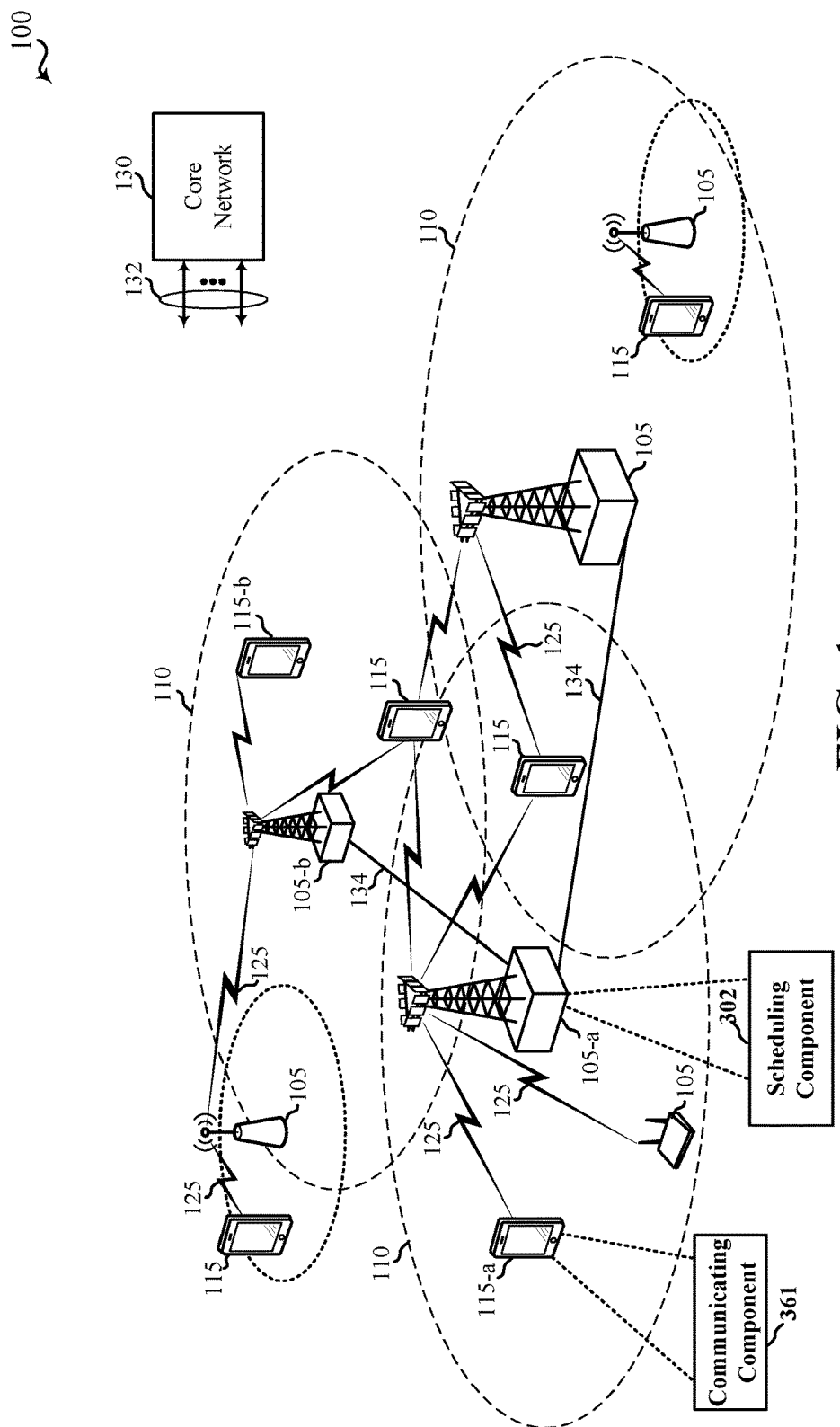
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to determining a configuration for transmission of reference signals (RS) in low latency wireless communications. For example, a low latency communication technology, also referred to herein as an ultra-low latency (ULL) communication technology, may be based on a legacy wireless communication technology, such as third generation partnership project (3GPP) long term evolution (LTE), but may utilize different length transmission time intervals (TTI) (e.g., the ULL communication technology may have a shorter TTI duration than the legacy communication technology). For example, a legacy LTE technology may utilize a TTI having a duration of a subframe defined in LTE (e.g., 1 millisecond), where a ULL LTE technology can be based on a TTI having a duration less than a subframe (e.g., one symbol (e.g., orthogonal frequency division multiplexing (OFDM) symbols, single carrier frequency division multiplexing (SC-FDM) symbols, etc.), two symbols, a subframe slot including multiple symbols, etc. of a subframe). In this regard, a lower latency in communications is achieved by the shorter, more frequent TTI.

In ULL LTE, using CSI-RS and/or UE-RS scheduling for a TTI as defined in LTE may cause significant overhead, especially for 8-port CSI-RS in a one symbol or two symbol TTI configuration. Adding UE-RS to the TTI can add to the overhead. Accordingly, aspects described herein relate to redesigning the CSI-RS pattern for ULL communication technologies to decimate the transmission in time and/or frequency as compared to the legacy (e.g., LTE) design. In some examples, transmission of the CSI-RS and/or UE-RS can be reduced in time and/or frequency. In one example, CSI-RS and/or UE-RS for ULL communication technologies can be dynamically scheduled in time to control RS overhead per TTI. In this example, CSI reporting based on the CSI-RS can be triggered based on the dynamically scheduled CSI-RS. In another example, CSI-RS and/or UE-RS for ULL communication technologies can be reduced in frequency density (e.g., to one or more RS frequency tones) to control RS overhead per TTI. In some examples, the CSI-RS can be dynamically scheduled at least in part by including scheduling information in a scheduling grant sent to a UE (e.g., as opposed to fixed radio resource control (RRC) configurations used in LTE). For example, the scheduling grant may indicate a process number that may correspond to the scheduled CSI-RS, which the UE can obtain and use to determine a TTI and/or RS frequency tone(s) over which to transmit the CSI-RS. Additionally, in an example, CSI-interference management (IM) information can also be dynamically triggered for a TTI, or interference information can be alternatively determined based on properties of ULL control channels being embedded in ULL data channels, as described further herein.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to allocate resources for communicating with UEs 115 using a ULL communication technology. Similarly, one or more of UEs 115 may include a communicating component 361 configured to communicate with one or more access points 105 using the ULL communication technology (e.g., ULL LTE). Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures. Additionally, scheduling component 302 can configure the UEs 115 to receive RSs from access point 105 (e.g., via downlink scheduling grants), and can transmit the RSs based on the configuration. Communicating component 361 can receive the RSs based on the configuration as well.

Figure 2:
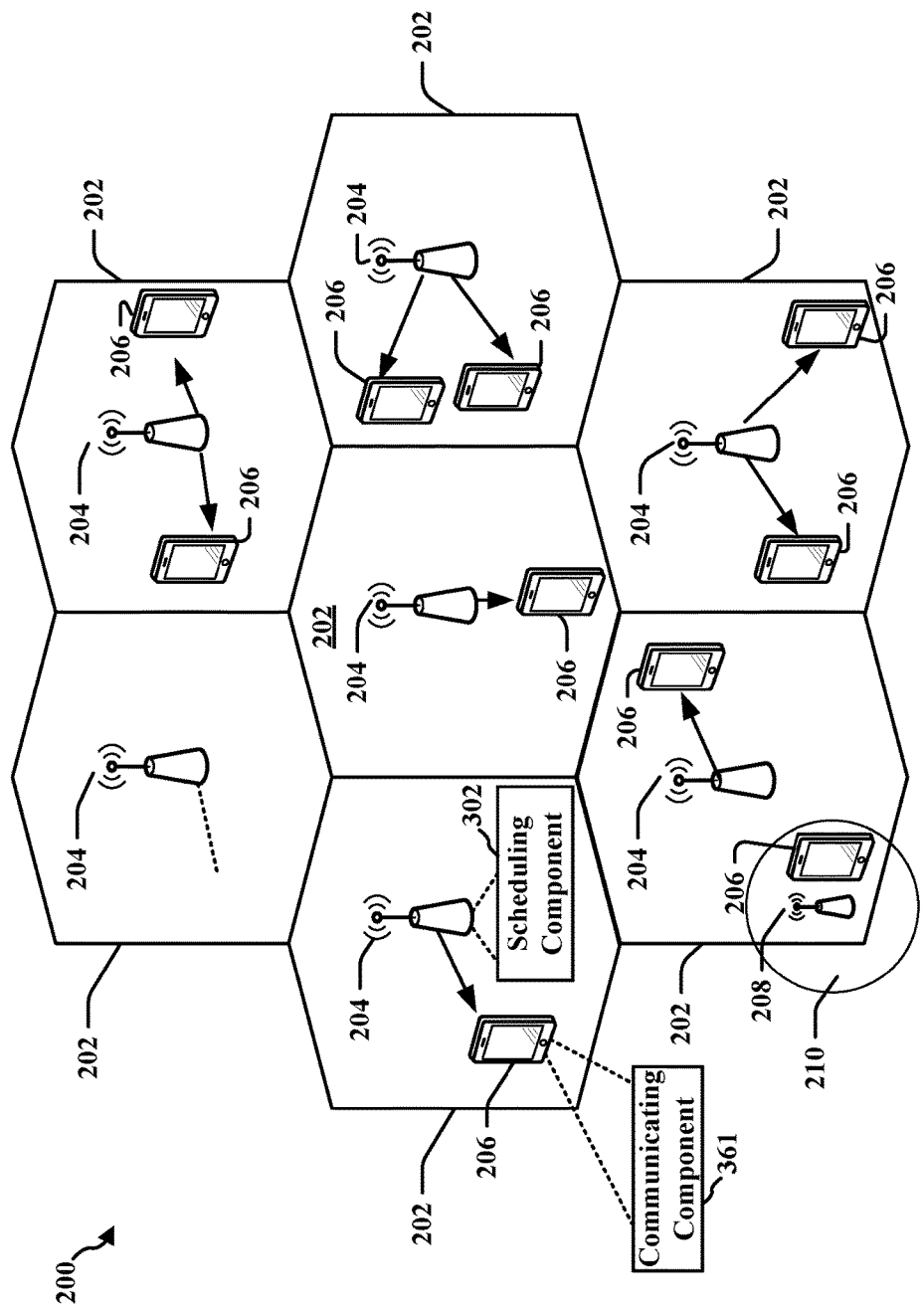
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include scheduling component 302 configured to allocate resources for communicating with UEs 206 using a ULL communication technology (e.g., for control/data channel communications and/or to communicate RSs). Similarly, one or more of UEs 206 may include a communicating component 361 configured to communicate with one or more eNBs 204 and/or 208 using the ULL communication technology (e.g., ULL LTE), and can accordingly communicate control/data communications, RSs, etc. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
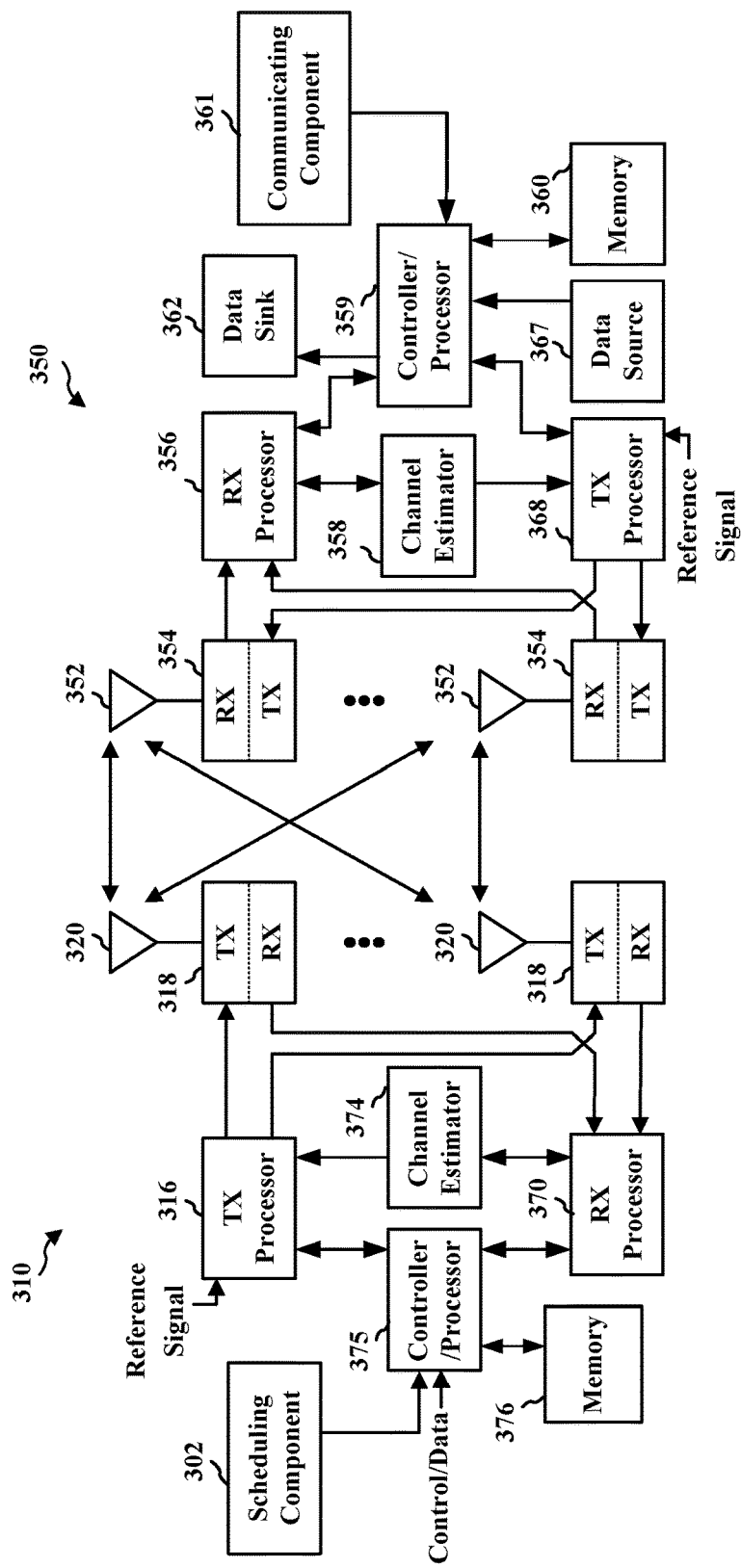
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include scheduling component 302 configured to allocate resources for communicating with a UE 350 using a ULL communication technology. Though scheduling component 302 is shown as coupled with controller/processor 375, in some examples substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, communicating component 361 configured to communicate with one or more access points 105 using the ULL communication technology (e.g., ULL LTE). Though communicating component 361 is shown as coupled with controller/processor 359, in some examples substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
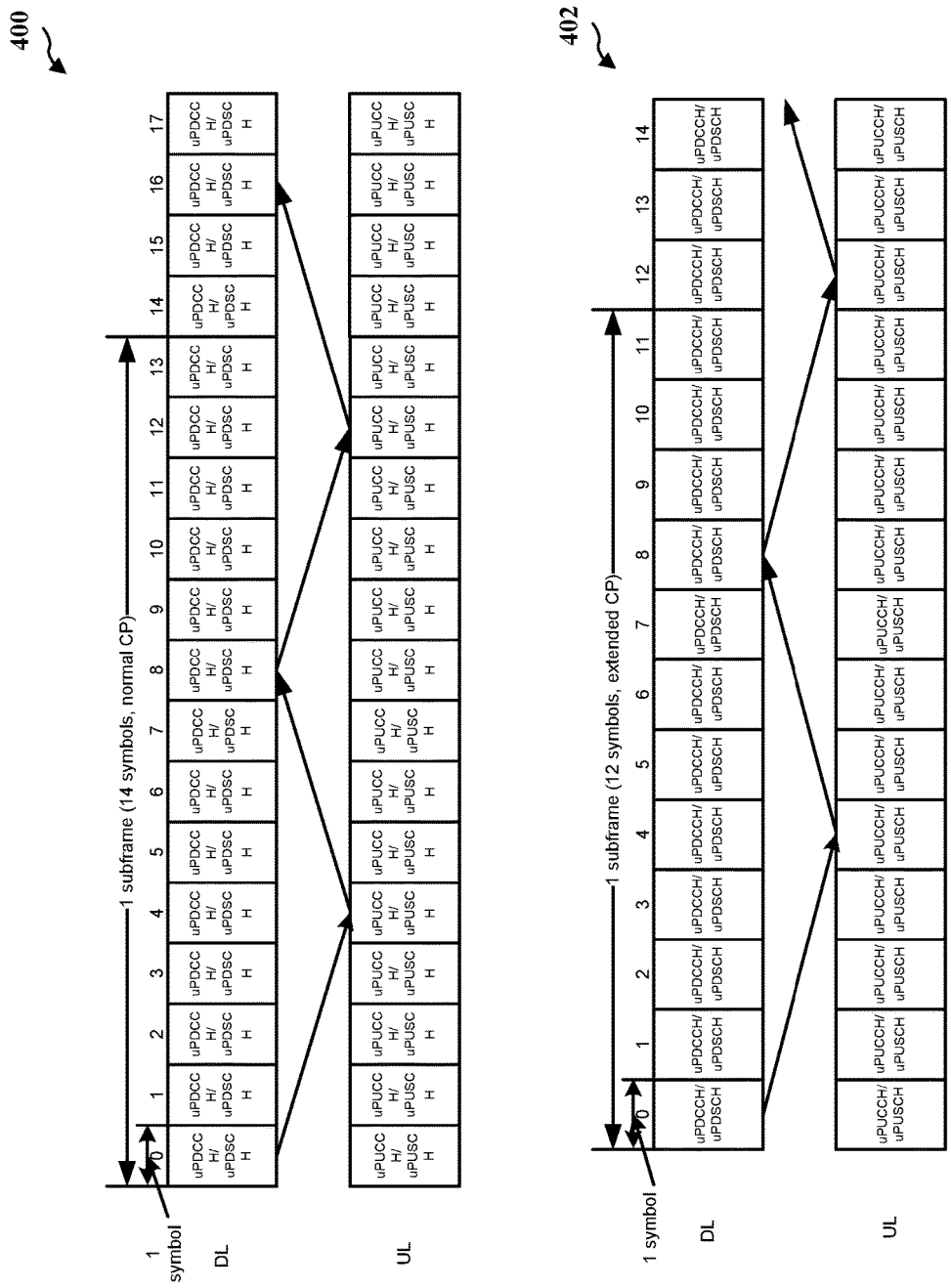
FIG. 4 is a diagram illustrating examples of timelines for ultra low latency (ULL) bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, for example, some symbols within a given subframe can be allocated for downlink communications (e.g., uPDCCH/uPDSCH) while other symbols are allocated for uplink communications (e.g., uPUCCH/uPUSCH).

Referring to FIGS. 5-10, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-10 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 5:
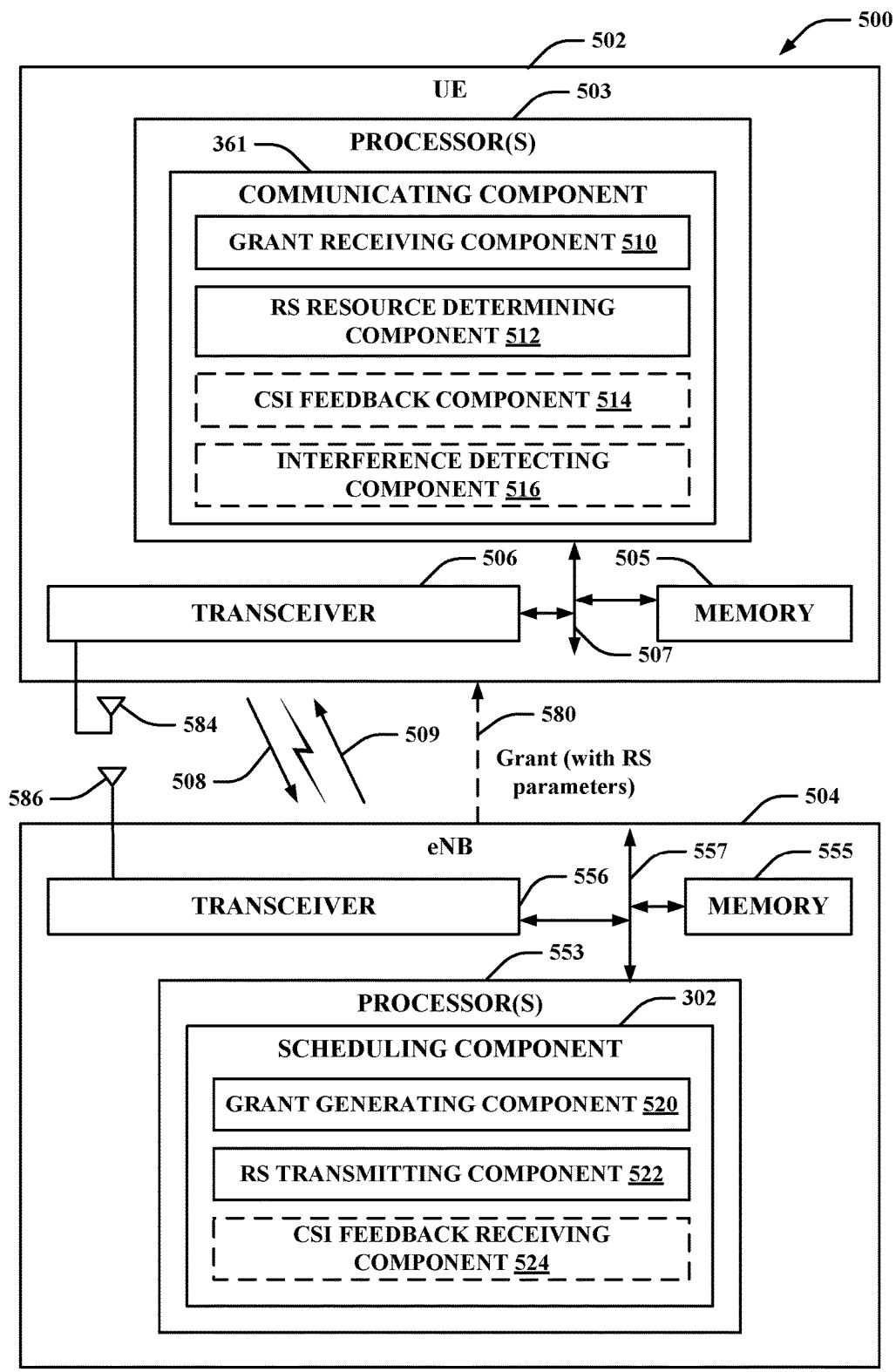
FIG. 5 is a diagram illustrating an example of a system for configuring reference signal (RS) resources in accordance with aspects described herein.

FIG. 5 illustrates an example of a system 500 for configuring resources for RS communication in ULL technologies. System 500 includes a UE 502 that communicates with an eNB 504 to access a wireless network, examples of which are described in FIGS. 1-3 (e.g., access points 105, eNB 204, small cell eNB 208, eNB 310, UEs 115, 206, 350, etc.), above. In an aspect, eNB 504 and UE 502 may have established one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources.

As described further herein, for example, eNB 504 may communicate a scheduling grant 580 (e.g., PDCCH or uPDCCH grant) that can indicate resources over which the UE 502 is to communicate (e.g., transmit or receive) data with eNB 504, where the resources can correspond to a ULL communication technology, as described. For example, resources related to a ULL communication technology can relate to a ULL timeline (e.g., a timeline having a TTI that is less than a subframe in duration, such as the timelines 400, 402 in FIG. 4). In addition, the scheduling grant 580 may include one or more RS parameters that can indicate a configuration for communicating RSs between UE 502 and eNB 504 (or other eNBs). As described, for example, a CSI-RS, UE-RS, etc. in ULL may be decimated at least in time (and/or frequency) at least as compared to a legacy communication technology (such as LTE), and thus the scheduling grant 580 may include one or more RS parameters indicating a time (e.g., ULL TTI) during which the CSI-RS, UE-RS, etc. for UE 502 is to be transmitted (and/or a frequency over which the CSI-RS, UE-RS, etc. for UE 502 is to be transmitted).

In an aspect, UE 502 may include one or more processors 503 and/or a memory 505 that may be communicatively coupled, e.g., via one or more buses 507, and may operate in conjunction with or otherwise implement a communicating component 361 for communicating using a ULL communication technologies based on one or more scheduling grants. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a grant receiving component 510 for receiving a scheduling grant from an eNB, where the scheduling grant may include one or more parameters related to communicating one or more RSs. In an aspect, for example, grant receiving component 510 may include hardware (e.g., one or more processor modules of the one or more processors 503) and/or computer-readable code or instructions stored in memory 505 and executable by at least one of the one or more processors 503 to perform the specially configured grant receiving operations described herein. For instance, the one or more processors 503 and/or memory 505 may execute actions or operations defined by a RS resource determining component 512 for determining an RS location (e.g., in time and/or frequency) based on information indicated in the scheduling grant. In an aspect, for example, RS resource determining component 512 may include hardware (e.g., one or more processor modules of the one or more processors 503) and/or computer-readable code or instructions stored in memory 505 and executable by at least one of the one or more processors 503 to perform the specially configured RS resource determining operations described herein.

For instance, the one or more processors 503 and/or memory 505 may optionally execute actions or operations defined by a CSI feedback component 514 for reporting CSI feedback based at least in part on one or more CSI-RSs received from eNB 504 (and/or other eNBs). In an aspect, for example, CSI feedback component 514 may include hardware (e.g., one or more processor modules of the one or more processors 503) and/or computer-readable code or instructions stored in memory 505 and executable by at least one of the one or more processors 503 to perform the specially configured CSI feedback operations described herein. For instance, the one or more processors 503 and/or memory 505 may optionally execute actions or operations defined by an interference detecting component 516 for detecting interference from one or more surrounding eNBs based on determining interference (noise) from signals thereof. In an aspect, for example, interference detecting component 516 may include hardware (e.g., one or more processor modules of the one or more processors 503) and/or computer-readable code or instructions stored in memory 505 and executable by at least one of the one or more processors 503 to perform the specially configured interference detecting operations described herein.

Similarly, in an aspect, eNB 504 may include one or more processors 553 and/or a memory 555 that may be communicatively coupled, e.g., via one or more buses 557, and may operate in conjunction with or otherwise implement a scheduling component 302 for generating scheduling grants for one or more UEs for ULL wireless communications. For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. In one example, the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a grant generating component 520 for generating a scheduling grant for a UE that may include one or more parameters related to communicating RSs with the UE. In an aspect, for example, grant generating component 520 may include hardware (e.g., one or more processor modules of the one or more processors 553) and/or computer-readable code or instructions stored in memory 555 and executable by at least one of the one or more processors 553 to perform the specially configured grant generating operations described herein. For instance, the one or more processors 553 and/or memory 555 may execute actions or operations defined by a RS transmitting component 522 for transmitting an RS with the UE based on the one or more parameters related to communicating RSs that may be indicated in the scheduling grant. In an aspect, for example, RS transmitting component 522 may include hardware (e.g., one or more processor modules of the one or more processors 553) and/or computer-readable code or instructions stored in memory 555 and executable by at least one of the one or more processors 553 to perform the specially configured RS transmitting operations described herein. For instance, the one or more processors 553 and/or memory 555 may optionally execute actions or operations defined by a CSI feedback receiving component 524 for receiving CSI feedback from a UE based on the transmitted RS. In an aspect, for example, CSI feedback receiving component 524 may include hardware (e.g., one or more processor modules of the one or more processors 553) and/or computer-readable code or instructions stored in memory 555 and executable by at least one of the one or more processors 553 to perform the specially configured CSI feedback operations described herein.

For example, transceivers 506, 556 may be configured to transmit and receive wireless signals through one or more antennas 584, 586 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

Figure 6:
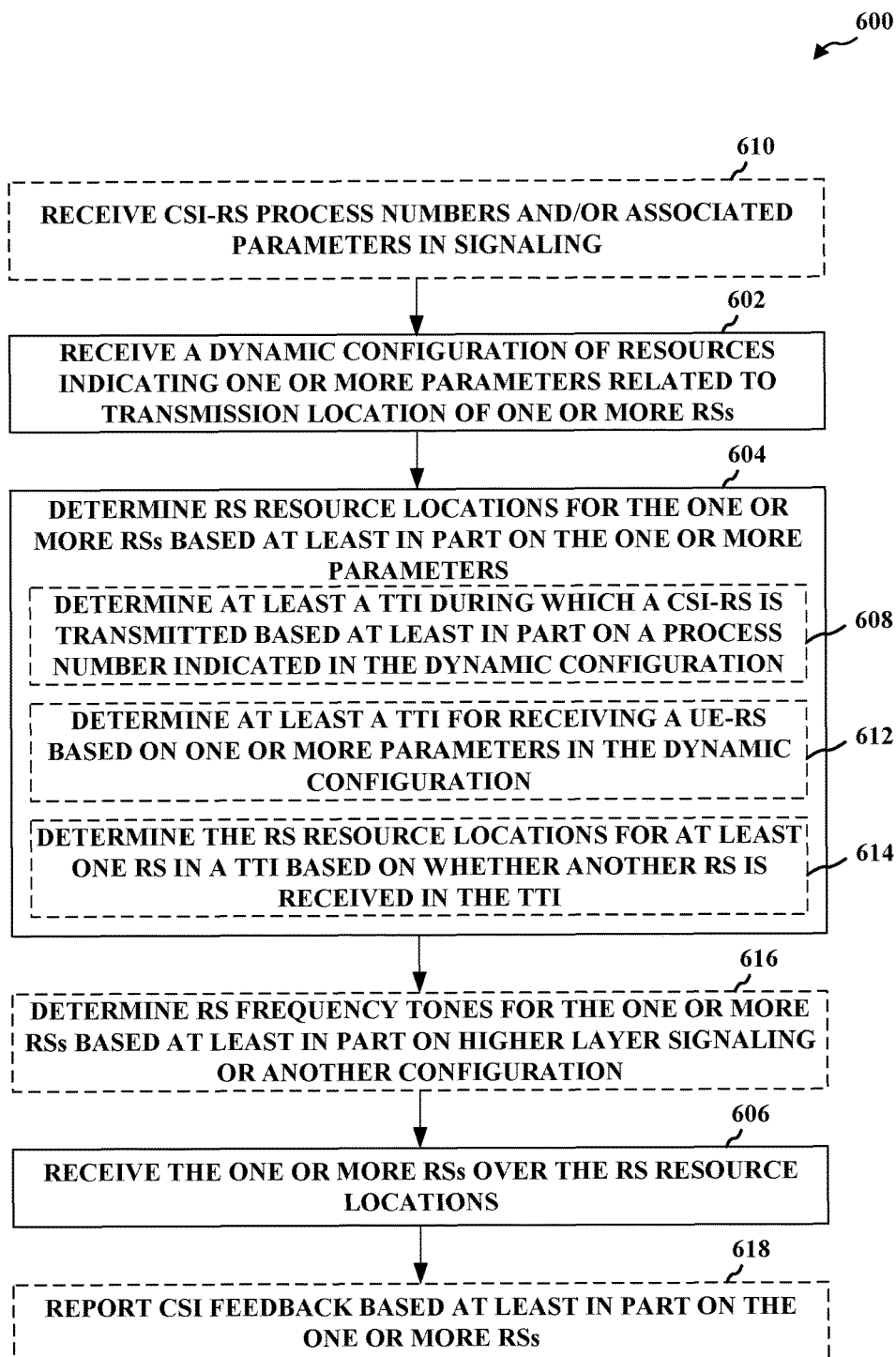
FIG. 6 is a flow chart of an example of a method for determining a configuration of RS resource locations in accordance with aspects described herein.

FIG. 6 illustrates an example of a method 600 for receiving (e.g., by a UE) one or more RSs in a low latency communication technology. At Block 602, the UE may receive a dynamic configuration of resources indicating one or more parameters related to transmission location of one or more RSs. In an aspect, grant receiving component 510, e.g., in conjunction with processor(s) 503, memory 505, and/or transceiver 506, may receive the dynamic configuration of resources indicating the one or more parameters related to transmission location of one or more RSs. In an example, grant receiving component 510 may receive the dynamic configuration in a scheduling grant 580 (e.g., a PDCCH or uPDCCH scheduling grant) from the eNB 504 that can additionally indicate resources over which the UE 502 can communicate with eNB 504 over one or more uplink and/or downlink channels. As described further herein, the one or more parameters may indicate the transmission location of the one or more RSs as RS transmission locations in time (e.g., one or more TTIs) and/or frequency (e.g., one or more resource elements (RE), resource blocks (RB), etc. over an OFDMA/SC-FDMA symbol).

Thus, at Block 604, the UE may determine RS resource locations for the one or more RSs based at least in part on the one or more parameters. In an aspect, RS resource determining component 512, e.g., in conjunction with processor(s) 503 and/or memory 505, may determine the RS resource locations for the one or more RSs based at least in part on the one or more parameters. For example, the eNB 504 can dynamically schedule the RSs (e.g., CSI-RS and/or UE-RS) in time and/or frequency to control RS overhead per TTI. In an example, the eNB 504 can utilize UE-specific stage 1 scheduling grants to schedule TTIs with UE-RS such to gate UE-RS transmissions for a particular UE. In another example, the eNB 504 can utilize a common stage 1 grant to convey a number of antenna ports for CSI-RS transmissions, and the eNB 504 can dynamically schedule TTIs with CSI-RS in a particular TTI.

At Block 606, the UE may receive the one or more RSs over the RS resource locations. In an aspect, communicating component 361, e.g., in conjunction with processor(s) 503, memory 505, and/or transceiver 506, may receive the one or more RSs over the RS locations. For example, communicating component 361 may receive CSI-RS and/or UE-RS from the eNB 504 based on the RS resource locations (e.g., over one or more TTIs and/or one or more REs, RBs, etc.) determined from the dynamic configuration, as described herein.

In one example, in determining the RS resource locations at Block 604, the UE may optionally, at Block 608, determine at least a TTI during which a CSI-RS is transmitted based at least in part on a process number indicated in the dynamic configuration. In an aspect, RS resource determining component 512, e.g., in conjunction with processor(s) 503 and/or memory 505, may determine at least the TTI during which the CSI-RS is transmitted based at least in part on the process number indicated in the dynamic configuration. For example, the dynamic configuration, which may be received in the scheduling grant 580, may include the one or more parameters, which may correspond to the process number. The process number can be used to identify a CSI-RS or other RS configuration. For example, the eNB 504 may use higher layer signaling (e.g., RRC signaling) to indicate configuration information for the process numbers, which may include, e.g., for a given process number, one or more TTI indices, RS tones, antenna ports, etc. for CSI-RS corresponding to the process number.

Thus, UE may optionally, at Block 610, receive the configuration as CSI-RS process numbers and/or associated parameters in signaling. For example, communicating component 361, e.g., in conjunction with processor(s) 503, memory 505, and/or transceiver 506, may receive the CSI-RS process numbers and/or parameters (e.g., TTI indices, RS tones, antenna ports, etc.) in signaling from eNB 504 (e.g., RRC signaling). In any case, communicating component 361, for example, can accordingly receive the CSI-RS from eNB 504 in a portion of TTIs corresponding to the process number (e.g., as indicated by the configuration for the process number) such to lower the resource usage for transmitting CSI-RS, as opposed to transmitting CSI-RS in each symbol. In addition, the scheduling grant may also indicate a number of antenna ports configured for CSI-RS, which may be used along with the process number in determining the RS resource locations (e.g., and/or based also on the RRC configured information).

Figure 11:
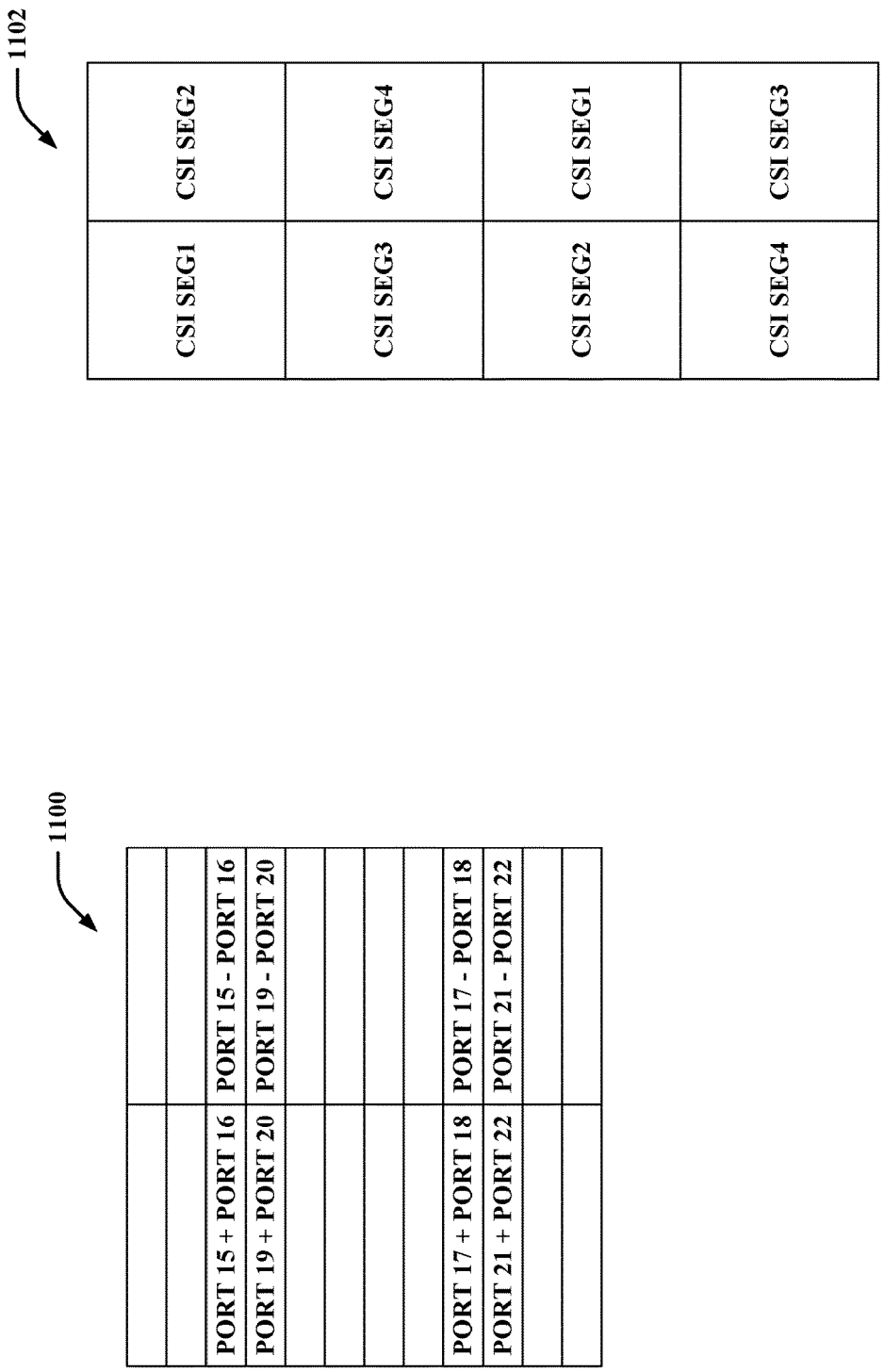
FIG. 11 is a diagram illustrating example of collections of TTIs for allocating resources for transmission of RSs and associated feedback in accordance with aspects described herein.

An example collection of TTIs 1100 having CSI-RS transmission is illustrated in FIG. 11. In this example, two TTIs are shown having consecutive transmission for two antenna ports in a given RS tone. For example, in the first TTI, CSI-RS for one antenna port (e.g., port 15)+CSI-RS for another antenna port (e.g., port 16) can be transmitted, and in the second TTI, CSI-RS for the one antenna port—CSI-RS for the other antenna port can be transmitted. Moreover, in this specific example, for a maximum of an 8 port CSI-RS configuration, a maximum 4 resource elements (e.g., tones) are consumed per resource block. In any case, as shown in this example, the scheduling grant may indicate a process number assigned to the UE 502, where the process number identifies one of the four configurations shown in TTIs 1100.

RS resource determining component 512 can then determine the RS tones, TTIs, antenna ports, etc. related to the process number (e.g., based on a configuration, which may be received over RRC signaling), and communicating component 361 can accordingly receive and process CSI-RSs received over the corresponding TTIs and RS resource elements.

In another example, in determining the RS resource locations at Block 604, the UE can optionally, at Block 612, determine at least a TTI for receiving a UE-RS based on one or more parameters in the dynamic configuration. In an aspect, RS resource determining component 512, e.g., in conjunction with processor(s) 503 and/or memory 505, may determine at least the TTI for receiving the UE-RS based on one or more parameters in the dynamic configuration. As described, the eNB 504 may use UE-specific grants to schedule TTIs with UE-RS, and RS resource determining component 512 can accordingly determine the TTIs based on the one or more parameters in the scheduling grant 580, which may explicitly identify the TTI during which UE-RS is to be transmitted by eNB 504 (e.g., a specific TTI within a specific subframe, a TTI within each subframe, etc.). Communicating component 361, for example, may accordingly receive the UE-RS from eNB 504 in the indicated TTI, and may use the UE-RS in demodulating data in signals from eNB 504.

In one example, in determining the TTI during which a CSI-RS is transmitted at Block 608, the UE may consider whether a UE-RS is to be transmitted at Block 612. If the UE-RS is to be transmitted in the TTI, this may impact a determination of whether the CSI-RS is also transmitted in the TTI, RS tones over which the CSI-RS is transmitted, and/or the like. Thus, in determining the RS resource locations at Block 604, the UE may optionally, at Block 614, determine the RS resource locations for at least one RS in a TTI based on whether another RS is received in the TTI. In an aspect, RS resource determining component 512, e.g., in conjunction with processor(s) 503 and/or memory 505, may determine the RS resource locations for at least one RS in the TTI based on whether another RS is received in the TTI. Thus, for example, RS resource determining component 512 may determine CSI-RS RS frequency locations (e.g., RS frequency tones) based on whether UE-RS is present (e.g., presence of UE-RS may result in less or differently positioned tones within the resource block).

At Block 616, the UE may optionally determine RS frequency tones for the one or more RSs based at least in part on higher layer signaling or another configuration. In an aspect, RS resource determining component 512, e.g., in conjunction with processor(s) 503, memory 505, and/or transceiver 506, may determine RS frequency tones for the one or more RSs based at least in part on higher layer signaling (e.g., RRC signaling) from the eNB 504, as described, or another configuration (e.g., stored at the UE 502). For instance, the RRC signaling may indicate RS frequency tones (e.g., REs), RBs, etc. related to process number, where the scheduling grant can indicate the process number for RSs for the UE 502. Thus, in this example, RS resource determining component 512 can determine the RS frequency tones based on the RRC signaled or stored configuration. In another example, the dynamic configuration, or the RRC signaled or stored configuration (e.g. per process number), may indicate antenna ports used to transmit the RSs, which may correspond to given RS frequency tones for the RSs. Thus, for example, RS resource determining component 512 can determine the RS frequency tones based on the antenna ports indicated for the RSs. In addition, for example, the RRC signaling may also indicate RS resource locations for the RS when other RSs are configured for the TTI.

At Block 618, the UE may optionally report CSI feedback based at least in part on the one or more RSs. In an aspect, CSI feedback component 514, e.g., in conjunction with processor(s) 503, memory 505, and/or transceiver 506, may report CSI feedback based at least in part on the one or more RSs. For example, CSI feedback component 514 may determine one or more subsequent TTIs for reporting the CSI feedback as a fixed offset from receiving the CSI-RS (e.g., 4 TTIs from the CSI-RS), a fixed offset from receiving an uplink scheduling grant for reporting the CSI feedback for the CSI-RS, as a dynamic offset (e.g., configured in the dynamic configuration or otherwise requested by eNB 504), etc., as described further in FIG. 7 below. In one example, if the UE 502 also has uPUSCH data to send (or in any case), eNB 504 may grant the UE 502 uPUSCH resources over which communicating component 361 can multiplex CSI feedback with the uPUSCH data. If the UE does not have uPUSCH data (or in any case), for example, eNB 504 can multiplex multiple UE's CSI feedback together on uPUSCH, in which case CSI feedback component 514 may report CSI feedback on the configured or determined segment of the uPUSCH, as described above. In addition, CSI feedback component 514 may indicate a process number for the CSI feedback to allow the eNB 504 to match the feedback to a particular CSI-RS (e.g., and/or the eNB 504 can match based on determining the segment of the control channel used for reporting CSI feedback).

Figure 7:
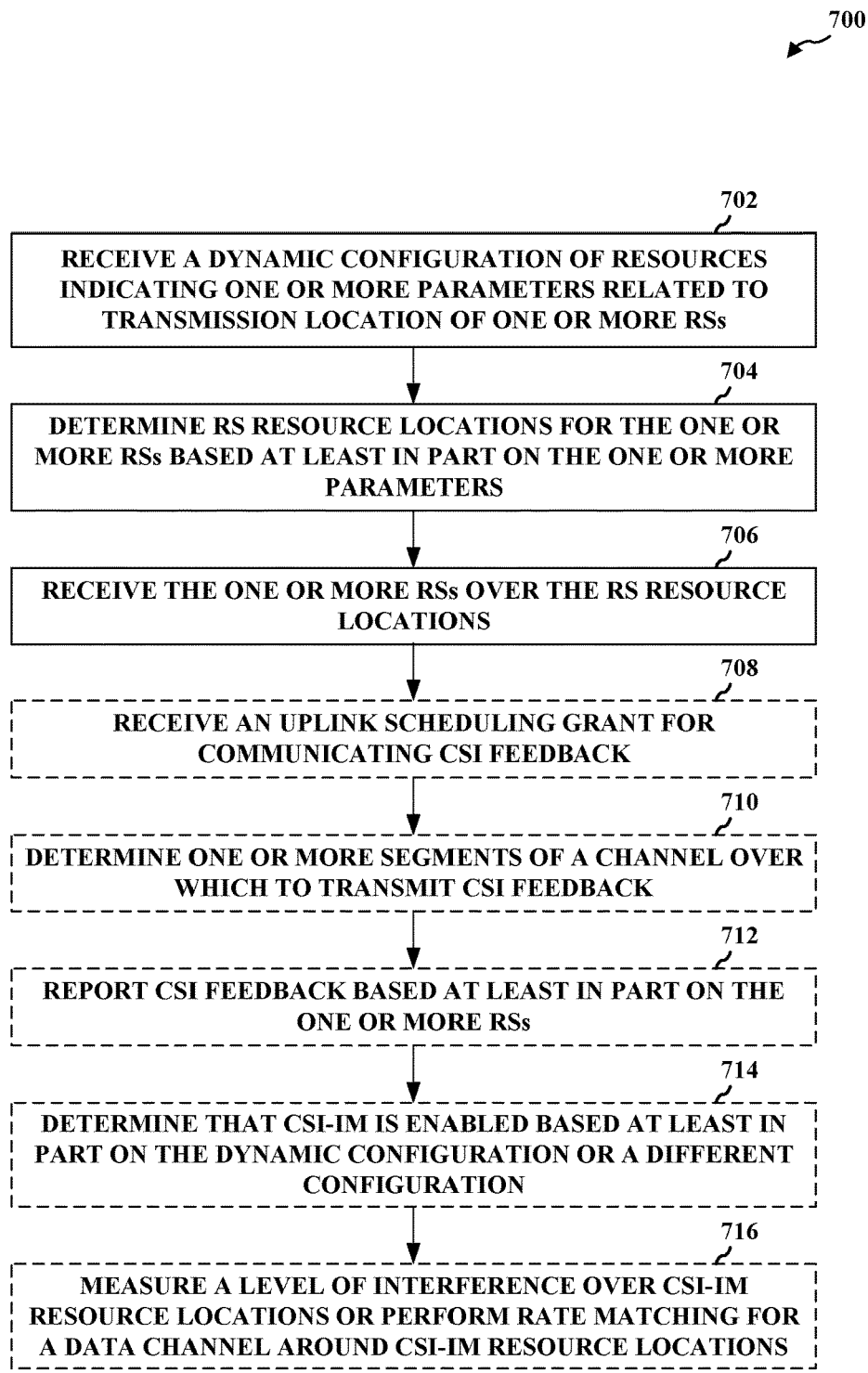
FIG. 7 is a flow chart of an example of a method for determining a configuration of RS resource locations and feedback reporting locations in accordance with aspects described herein.

FIG. 7 illustrates an example of a method 700 for receiving (e.g., by a UE) one or more RSs in a low latency communication technology. At Block 702, the UE may receive a dynamic configuration of resources indicating one or more parameters related to transmission location of one or more RSs; at Block 704, the UE may determine RS resource locations for the one or more RSs based at least in part on the one or more parameters; and at Block 706, the UE can receive the one or more RSs over the RS resource locations, as described above in similar Blocks 602, 604, 606 in FIG. 6 (e.g., in conjunction with processor(s) 503, memory 505, and/or transceiver 506).

In addition, in an aspect, the UE, at Block 708, may optionally receive an uplink scheduling grant for communicating CSI feedback. For example, grant receiving component 510, e.g., in conjunction with processor(s) 503, memory 505, and/or transceiver 506, may receive the uplink scheduling grant for communicating the CSI feedback. In one example, the uplink scheduling grant may indicate frequency resources over which to report feedback for the CSI-RS in one or more upcoming TTIs (e.g., a TTI that is a fixed number of TTIs from the TTI over which the uplink scheduling grant is received, a TTI that is also indicated in the uplink scheduling grant by index or offset from a current TTI, etc.). In addition, in an example, the uplink scheduling grant may indicate a process number corresponding to a CSI-RS for which CSI feedback is to be reported over the uplink resources.

In addition, the UE may optionally, at Block 710, determine one or more segments of a channel over which to transmit CSI feedback. For example, CSI feedback component 514, e.g., in conjunction with processor(s) 503, memory 505, and/or transceiver 506, may determine the one or more segments of the channel over which to transmit CSI feedback. In one example, the uplink scheduling grant may indicate the one or more segments over an uplink channel over which to transmit CSI feedback in one or more TTIs.

Thus, for example, CSI feedback component 514 may determine the one or more segments based on the uplink scheduling grant. For example, a uPUSCH can be segmented into a number of segments for transmitting CSI feedback. An example is shown in collection of TTIs 1102 in FIG. 11, where each segment of the uPUSCH may correspond to a CSI-RS transmission. In an example, eNB 504 can indicate an index of the segment of the uPUSCH in the uplink scheduling grant for the UE 502 to transmit CSI feedback. CSI feedback component 514, in this example, can determine the index of one or more segments for transmitting CSI feedback in corresponding TTIs.

In addition, the UE may optionally, at Block 712, report CSI feedback based at least in part on the one or more REs, as described above in similar Block 618 in FIG. 6 (e.g., in conjunction with processor(s) 503, memory 505, and/or transceiver 506). Reporting the feedback in this example may further be based on the uplink scheduling grant and/or information indicated in the uplink scheduling grant. For example, CSI feedback component 514, e.g., in conjunction with processor(s) 503, memory 505, and/or transceiver 506, can report CSI feedback for a CSI-RS indicated in the uplink scheduling grant (e.g., by process number). Thus, for example, CSI feedback component 514 can determine the CSI-RS corresponding to the process number (e.g., the CSI-RS received over time and/or frequency resources related to the process number, as described), can determine one or more metrics of the CSI-RS, and can report the metrics (e.g., CQI) or related calculations to the eNB 504 over the resources based on the uplink scheduling grant.

For example, CSI feedback component 514 may report the CSI feedback in uPUSCH resources corresponding to one or more TTIs that are a fixed or dynamic (e.g., indicated in the uplink scheduling grant or dynamic configuration) number of TTIs from the TTI over which the uplink scheduling grant is received. In another example, CSI feedback component 514, e.g., in conjunction with processor(s) 503, memory 505, and/or transceiver 506, can report the CSI feedback by multiplexing the CSI feedback with uPUSCH data the UE 502 may have for sending in the resources corresponding to the uplink scheduling grant, and may transmit the multiplexed feedback and data over the uPUSCH resources in the one or more TTIs. In yet another example (e.g., where UE 502 does not have uPUSCH data to send), CSI feedback component 514 can report the CSI feedback in one or more segments of the uPUSCH in the corresponding TTIs (e.g., based on an index indicated in the uplink scheduling grant, and a known or configured association to the one or more segments in the one or more TTIs, such as shown in the example configuration in the TTIs 1102 of FIG. 11).

In an example, at Block 714, the UE may optionally determine that CSI-IM is enabled based at least in part on the dynamic configuration or a different configuration. In an aspect, interference detecting component 516, e.g., in conjunction with processor(s) 503 and/or memory 505, may determine that CSI-IM is enabled based at least in part on the dynamic configuration or a different configuration. Thus, for example, the one or more parameters in the dynamic configuration (e.g., received in the scheduling grant from eNB 504) may include whether CSI-IM is enabled. In another example, the different configuration may relate to a separate dynamic configuration for CSI-IM, which may be received from eNB 504 in the scheduling grant or otherwise). Thus, interference detecting component 516 may determine such, and may determine which RS frequency tones correspond to CSI-IM resource locations, which are used by other eNBs (and are punctured with null tones by eNB 504 to allow transmission of CSI-RS by the other eNBs without interference from eNB 504) in one or more given TTIs. In any case, frequency pattern/spacing of CSI-IM resource locations may be configured by higher layer signaling (e.g., RRC signaling), and thus communicating component 361 can determine the configuration of CSI-IM resource locations in the one or more TTIs from the higher layer signaling based on interference detecting component 516 detecting that CSI-IM is enabled.

Additionally, for example at Block 716, the UE may optionally measure a level of interference over CSI-IM resource locations or perform rate matching for a data channel around CSI-IM resource locations. In an aspect, interference detecting component 516, e.g., in conjunction with processor(s) 503, memory 505, and/or transceiver 506, may measure a level of interference over CSI-IM resource locations, or communicating component 361, e.g., in conjunction with processor(s) 503, memory 505, and/or transceiver 506, may perform rate matching for a data channel around CSI-IM resource locations.

Figure 8:
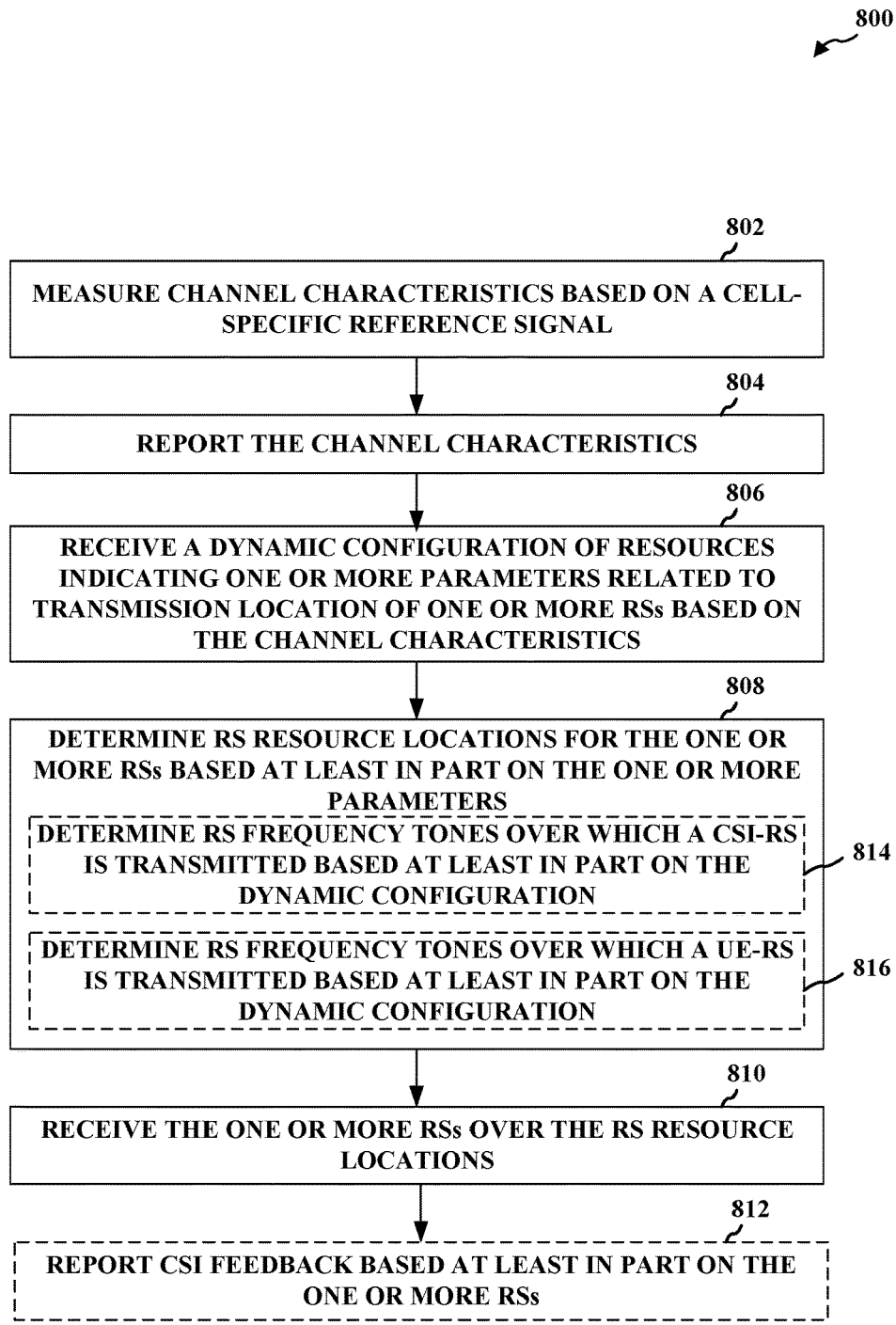
FIG. 8 is a flow chart of an example of a method for determining a configuration of RS resource locations including RS frequency tones in accordance with aspects described herein.

FIG. 8 illustrates an example of a method 800 for receiving (e.g., by a UE) one or more RSs in a low latency communication technology. At Block 802, the UE may measure channel characteristics based on a cell-specific reference signal (CRS), and at Block 804, the UE may report the channel characteristics. In an aspect, communicating component 361, e.g., in conjunction with processor(s) 503, memory 505, and/or transceiver 506, may measure channel characteristics based on a CRS received from eNB 504, and may report the channel characteristics (e.g., to the eNB 504). For example, communicating component 361 may sense channel characteristics continuously from CRS (e.g., using antenna ports 0-3), and can report the channel characteristics to eNB 504. As described further herein, this can allow the eNB 504 to select RS tones for configuring CSI-RS transmission for corresponding CSI-RS antenna ports based on the reported characteristics.

Thus, in method 800, the UE can also, at Block 806, receive a dynamic configuration of resources related to transmission location of one or more RSs based on the channel characteristics; at Block 808, determine RS resource locations for the one or more RSs based at least in part on the one or more parameters; at Block 810, receive the one or more RSs over the RS resource locations; and optionally, at Block 812, report the CSI feedback based at least in part on the one or more RSs, as described in similar Blocks 602, 604, 606, 618 FIG. 6 above (e.g., in conjunction with processor(s) 503, memory 505, and/or transceiver 506). In an example, the dynamic configuration of resources received at Block 806 may be based on the reported channel characteristics, and determining the RS resource locations at Block 808 may be based on RS frequency tones indicated in the dynamic configuration.

For example, in determining the RS resource locations at Block 604, the UE may optionally, at Block 814, determine RS frequency tones over which a CSI-RS is transmitted based at least in part on the dynamic configuration. In an aspect, RS resource determining component 512, e.g., in conjunction with processor(s) 503 and/or memory 505, may determine the RS frequency tones over which the CSI-RS is transmitted based at least in part on the dynamic configuration. For example, the dynamic configuration may indicate the RS frequency tones and/or information from which the RS frequency tones may be determined, such as a periodicity (which can be based on the reported channel characteristics), an antenna port, etc. for the CSI-RS.

Similarly, for example, in determining the RS resource locations at Block 604, the UE may optionally, at Block 816, determine RS frequency tones over which a UE-RS is transmitted based at least in part on the dynamic configuration. In an aspect, RS resource determining component 512, e.g., in conjunction with processor(s) 503 and/or memory 505, may determine the RS frequency tones over which the UE-RS is transmitted based at least in part on the dynamic configuration. For example, the dynamic configuration may indicate the RS frequency tones and/or information from which the RS frequency tones may be determined, such as a periodicity (which can be based on the reported channel characteristics), an antenna port, etc. for the UE-RS.

In this regard, for example, communicating component 361 can receive the CSI-RS and/or UE-RS over RS frequency tones indicated in, or determine from, the dynamic configuration in one or more corresponding TTIs. Example frequency allocations (e.g., of RS tones) for UE-RS and CSI-RS are shown in FIG. 12, where example allocation 1200 over 2 TTIs has a ⅓ reduction in UE-RS overhead as compared to LTE, example allocation 1202 has a ⅔ reduction in UE-RS overhead as compared to LTE, example allocation 1204 has a ½ reduction in CSI-RS overhead as compared to LTE, and example allocation 1206 has a 2×CSI-RS capacity for greater than 2 antenna port configuration. For example, the higher the channel coherence, the less RSs needed for UE demodulation and/or reporting CSI feedback. The eNB 504 can accordingly select an allocation of RS frequency tones for the one or more RSs, and may indicate the RS frequency tones (and/or corresponding antenna port, periodicity, etc.) in the dynamic configuration to the UE 502, which can determine the RS frequency tones and accordingly receive the RSs, as described above.

Figure 9:
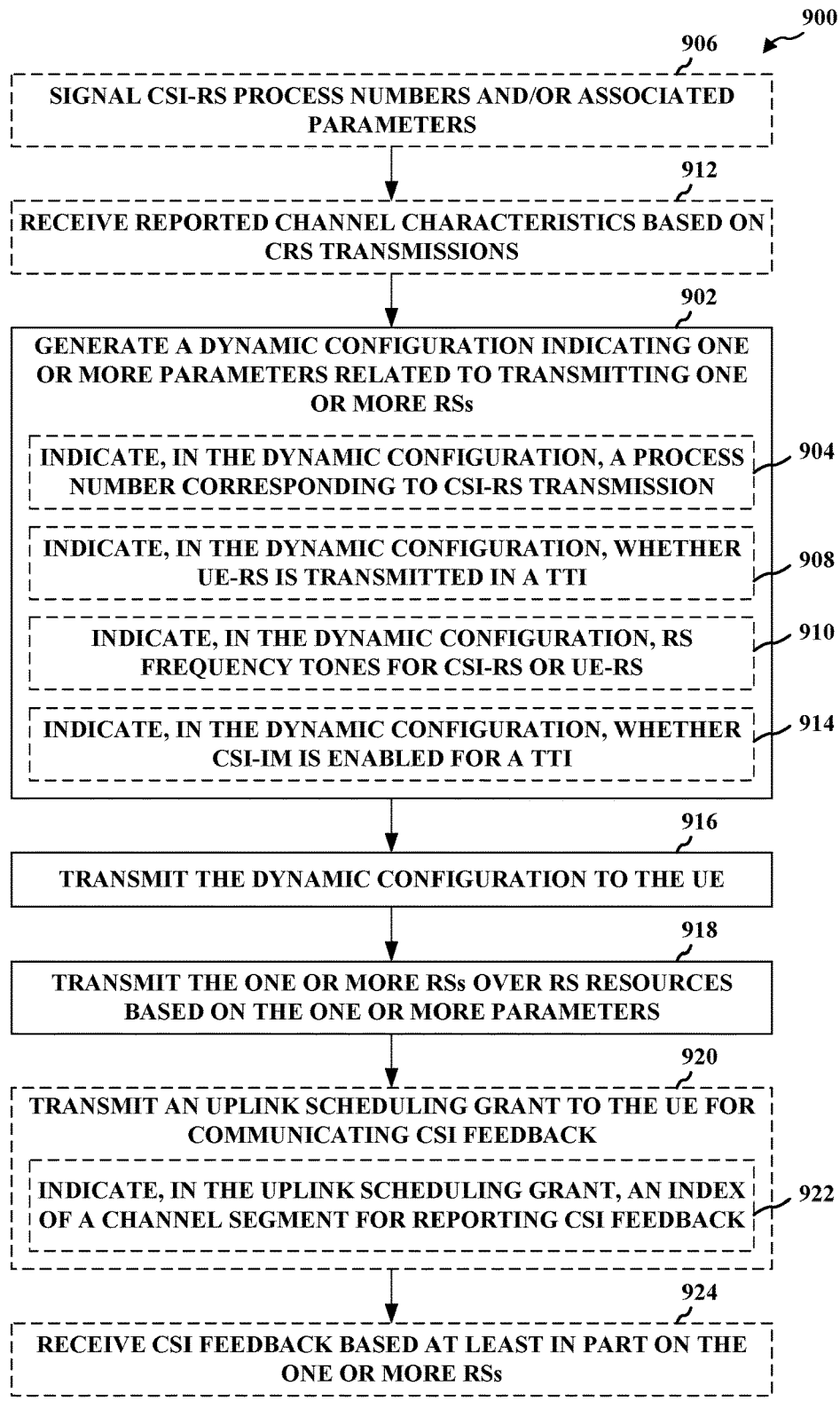
FIG. 9 is a flow chart of an example of a method for configuring RS resource locations in accordance with aspects described herein.

FIG. 9 illustrates an example of a method 900 for transmitting (e.g., by an eNB) one or more RSs in a low latency communication technology. At Block 902, the eNB may generate a dynamic configuration of resources indicating one or more parameters related to transmitting one or more RSs. In an aspect, grant generating component 520, e.g., in conjunction with processor(s) 553, memory 555, and/or transceiver 556, may generate a dynamic configuration of resources indicating one or more parameters related to transmitting one or more RSs. In an example, as described, grant generating component 520 may generate a scheduling grant 580 (e.g., a PDCCH or uPDCCH scheduling grant) for a specific UE 502 that indicates resources over which the UE 502 can receive or transmit communications from/to eNB 504, and also may indicate the dynamic configuration for RS transmission. The dynamic configuration may indicate one or more RS transmission locations indicating when and/or what frequency tones the eNB 504 is to transmit certain RSs to the UE 502, which can give the eNB 504 control over which resources are used for RS transmission, and thus the eNB 504 may avoid overloading the frequency spectrum with RS transmissions (e.g., CSI-RS, UE-RE, etc.) in each TTI.

In one example, in generating the dynamic configuration at Block 902, the eNB may optionally, at Block 904, indicate, in the dynamic configuration, a process number corresponding to CSI-RS transmission. In an aspect, grant generating component 520, e.g., in conjunction with processor(s) 553, memory 555, and/or transceiver 556, may indicate, in the dynamic configuration (e.g., which may be in the scheduling grant 580), a process number corresponding to CSI-RS transmission (or other RS transmission). For example, the process number may correspond to a RS configuration, which may be at least partially configured by higher layer signaling (e.g., RRC signaling) to the UE 502.

Thus, in an example, eNB 504 may optionally, at Block 906, signal CSI-RS process numbers and/or associated parameters. For example, scheduling component 302, e.g., in conjunction with processor(s) 553, memory 555, and/or transceiver 556, can signal the CSI-RS process numbers and/or associated parameters (e.g., in a configuration) to one or more UEs. For example, the RS configurations may indicate a TTI (e.g., TTI index), one or more RS tones, one or more antenna ports, etc. for transmitting the RS (e.g., CSI-RS), as described. In any case, in this regard, grant generating component 520 may indicate CSI-RSs transmitted in a TTI corresponding to the scheduling grant by indicating the associated process number(s) of the configured CSI-RSs that are transmitted in the TTI.

At Block 908, the eNB may optionally indicate, in the dynamic configuration, whether UE-RS is transmitted in a TTI. In an aspect, grant generating component 520, e.g., in conjunction with processor(s) 553, memory 555, and/or transceiver 556, may indicate, in the dynamic configuration (e.g., which may be in the scheduling grant 580), whether UE-RS is transmitted in a TTI. As described, for example, the eNB 504 can indicate whether the UE-RS is transmitted in one or more TTIs, and the UE 502 receiving the scheduling grant can accordingly also determine whether UE-RS is received in a given TTI.

At Block 910, the eNB may optionally indicate, in the dynamic configuration, RS frequency tones for the CSI-RS or UE-RS. In an aspect, grant generating component 520, e.g., in conjunction with processor(s) 553, memory 555, and/or transceiver 556, may indicate, in the dynamic configuration (e.g., which may be in the scheduling grant 580), RS frequency tones for the CSI-RS or UE-RS. For example, grant generating component 520 may determine the RS frequency tones (e.g., a frequency density of tones within a TTI) based on the reported channel characteristics based on t the CRS transmission.

In one example, eNB may optionally, at Block 912, receive reported channel characteristics based on CRS transmissions. In an aspect, scheduling component 302, e.g., in conjunction with processor(s) 553, memory 555, and/or transceiver 556, may receive reported channel characteristics based on CRS transmissions from UE 502. For example, eNB 504 may transmit CRS over a plurality of antenna ports (e.g., antenna ports 0-3 in LTE). UE 502 can measure the CRS and report channel characteristics (e.g., an estimate of a channel coherence bandwidth corresponding to a CRS port), as described. In this regard, grant generating component 520 may determine a frequency density for the one or more RSs based at least in part on the estimate of the channel coherence bandwidth. For example, grant generating component 520 may determine a lower acceptable frequency periodicity for one or more RS tones for a higher reported coherence bandwidth. In a specific example, eNB 504 may store a configuration that associates RS tone periodicity to thresholds of corresponding estimated channel coherence bandwidth, and grant generating component 520 can accordingly determine a periodicity for the RSs based on comparing the estimated channel coherence bandwidth to the thresholds.

In any case, for example, generating the dynamic configuration at Block 902, in this regard, may be based on the reported channel characteristics. For example, scheduling component 302 can transmit CRS using antenna ports 0-3, UE-RS using antenna ports 7-14, and CSI-RS using antenna ports 15-22. The antenna ports and related RS transmissions may be quasi co-located (e.g., assumed to have similar channel characteristics regarding Doppler shift, Doppler spread, average delay, and delay spread). As described, UE 502 can periodically estimate channel coherence bandwidth from CRS ports 0-3 and report to eNB 504. Grant generating component 520, for example, can then map the channel coherence to an acceptable periodicity of RS tones in determining the RS tones for transmitting each RS (e.g., which may be based on comparing the channel coherence to one or more threshold related to acceptable periodicities of RS tones). For example, grant generating component 520 can generate the dynamic configuration to indicate the periodicity, an index of one or more of the RS frequency tones over which the RS is transmitted, etc. In addition, for example, this information may be indicated in higher layer (e.g., RRC) signaling. Moreover, grant generating component 520 may determine which process number to assign to the UE 502 for receiving CSI-RS where the process numbers may correspond to varying numbers of RS tones, periodicity, etc. used for CSI-RS transmission, etc. Selecting RS tones based on reported channel coherence, for example, may reduce UE-RS overhead for high coherence channels, which can allow CSI-RS transmission in the same TTI while maintaining a lower total RS overhead level than where UE-RS is transmitted in the various RS frequency tones used in legacy communication technologies (e.g., LTE). In another example, this may facilitate multiple CSI-RS configurations being multiplexed together within the same TTI allowing for higher parallelism and lower CSI feedback latency.

As described, example frequency allocations (e.g., of RS tones) for UE-RS and CSI-RS are shown in FIG. 12, where example allocation 1200 over 2 TTIs has a ⅓ reduction in UE-RS overhead as compared to LTE, example allocation 1202 has a ⅔ reduction in UE-RS overhead as compared to LTE, example allocation 1204 has a ½ reduction in CSI-RS overhead as compared to LTE, and example allocation 1206 has a 2×CSI-RS capacity for greater than 2 port configuration. For example, the higher the channel coherence, the less RSs needed for UE demodulation and/or reporting CSI feedback. In one example, where UE-RS transmission is reduced based on the reported CRS measurements (e.g., in TTIs 1200, 1202), the free resources where UE-RS would have otherwise been transmitted (e.g., in LTE) can be used to transmit CSI-RS.

Also, at Block 914, the eNB may optionally indicate, in the dynamic configuration, whether CSI-IM is enabled for a TTI. In an aspect, grant generating component 520, e.g., in conjunction with processor(s) 553, memory 555, and/or transceiver 556, may indicate, in the dynamic configuration (e.g., which may be in the scheduling grant 580), whether CSI-IM is enabled for a TTI. eNB 504 may enable CSI-IM and may accordingly transmit null power CSI-RS tones (also referred to as punctured tones) in TTIs where CSI-IM is enabled. As described, the null power CSI-RS tones may correspond to tones used by neighboring eNBs for transmitting CSI-RS. This can enable the UE 502 to determine interference from other eNBs in these TTIs, rate match around these TTIs, etc., as described. The configuration of the null power tones may be indicated in a separate configuration (e.g., which may be a higher layer configuration, a different dynamic configuration indicated in a scheduling grant or other communication to a UE, etc.).

At Block 916, the eNB may transmit the dynamic configuration to the UE. In an aspect, scheduling component 302, e.g., in conjunction with processor(s) 553, memory 555, and/or transceiver 556, may transmit the dynamic configuration to the UE 502. For example, scheduling component 302 may transmit the dynamic configuration in a scheduling grant 580 (e.g., a grant sent over a uPDCCH) for scheduling resources to the UE 502 to communicate with eNB 504 (e.g., over a uPDSCH, uPUCCH, uPUSCH, etc.).

At Block 918, the eNB may transmit the one or more RSs over RS resources based on the one or more parameters. In an aspect, RS transmitting component 522, e.g., in conjunction with processor(s) 553, memory 555, and/or transceiver 556, may transmit the one or more RSs over RS resources based on the one or more parameters specified in the dynamic configuration (e.g., in the scheduling grant 580). For example, RS transmitting component 522 may transmit UE-RS in TTIs indicated in the dynamic configuration, may transmit CSI-RSs in TTIs and/or using RS frequency tones associated with an indicated process number or otherwise indicated in the dynamic configuration, etc. In one specific example, CSI-RS transmission in one or more TTIs may correspond to the collection of TTIs 1100 in FIG. 11 in certain TTIs, collection of TTIs 1204 or 1206 in FIG. 12 (e.g., based on reported CRS measurements), etc. In addition, in an example, UE-RS transmission in one or more TTIs may correspond to collection of TTIs 1200, 1202 in FIG. 12 (e.g., based on reported CRS measurements).

At Block 920, the eNB may optionally transmit an uplink scheduling grant to the UE for communicating CSI feedback. In an aspect, scheduling component 302, e.g., in conjunction with processor(s) 553, memory 555, and/or transceiver 556, can transmit the uplink scheduling grant to the UE 502 for communicating CSI feedback. For example, scheduling component 302 can generate the uplink scheduling grant to indicate a CSI for which feedback is requested. In one example, scheduling component 302 can generate the uplink scheduling grant to allow the UE 502 to transmit data (e.g., over uPUSCH), and the UE 502 can multiplex CSI feedback with data for transmitting over the channel. In an example, eNB 504 can segment the channel (e.g., uPUSCH) to facilitate multiple UEs multiplexing CSI feedback over the channel.

In this regard, at Block 922, the UE may optionally indicate, in the uplink scheduling grant, an index of a channel segment for reporting CSI feedback. In an aspect, scheduling component 302, e.g., in conjunction with processor(s) 553, memory 555, and/or transceiver 556, can indicate, in the uplink scheduling grant, the index of the channel segment for reporting CSI feedback. As described above, the index may relate to a segmented frequency band (e.g., a number of REs, RBs, etc.) of the channel, as shown in collection of TTIs 1102 in FIG. 11, where each segment may correspond to feedback for a CSI-RS transmission (e.g., an index 0-3 for the first TTI and/or second TTI). By indicating the index in the uplink scheduling grant, the UE 502 can report CSI feedback for the related CSI-RS using the segment (e.g., in a TTI that is a fixed or configured offset from the corresponding CSI-RS transmission). Thus, configuring UEs with the different indices allows the eNB 504 to multiplex CSI feedback from a plurality of UEs in a TTI. In one example, eNB 504 can determine to indicate the index in the scheduling grant based at least in part on whether the UE 502 also has uPUSCH data to send or not (e.g., based on a buffer status report received from the UE 502).

At Block 924, the eNB may optionally receive CSI feedback based at least in part on the one or more RSs. In an aspect, CSI feedback receiving component 524, e.g., in conjunction with processor(s) 553, memory 555, and/or transceiver 556, may receive the CSI feedback based at least in part on the one or more RSs. As described, for example, CSI feedback receiving component 524 may receive the CSI feedback from a UE 502 in a segment of a control channel, where the segment is indicated in the uplink scheduling grant (e.g., as a segment index). In this regard, eNB 504 may also receive CSI feedback from other UEs multiplexed over the control channel. Moreover, for example, CSI feedback receiving component 524 may receive the CSI feedback in a TTI that is a fixed or dynamically configured (e.g., in the uplink scheduling grant or other signaling) number of TTIs from the TTI in which the uplink scheduling grant is transmitted.

Figure 10:
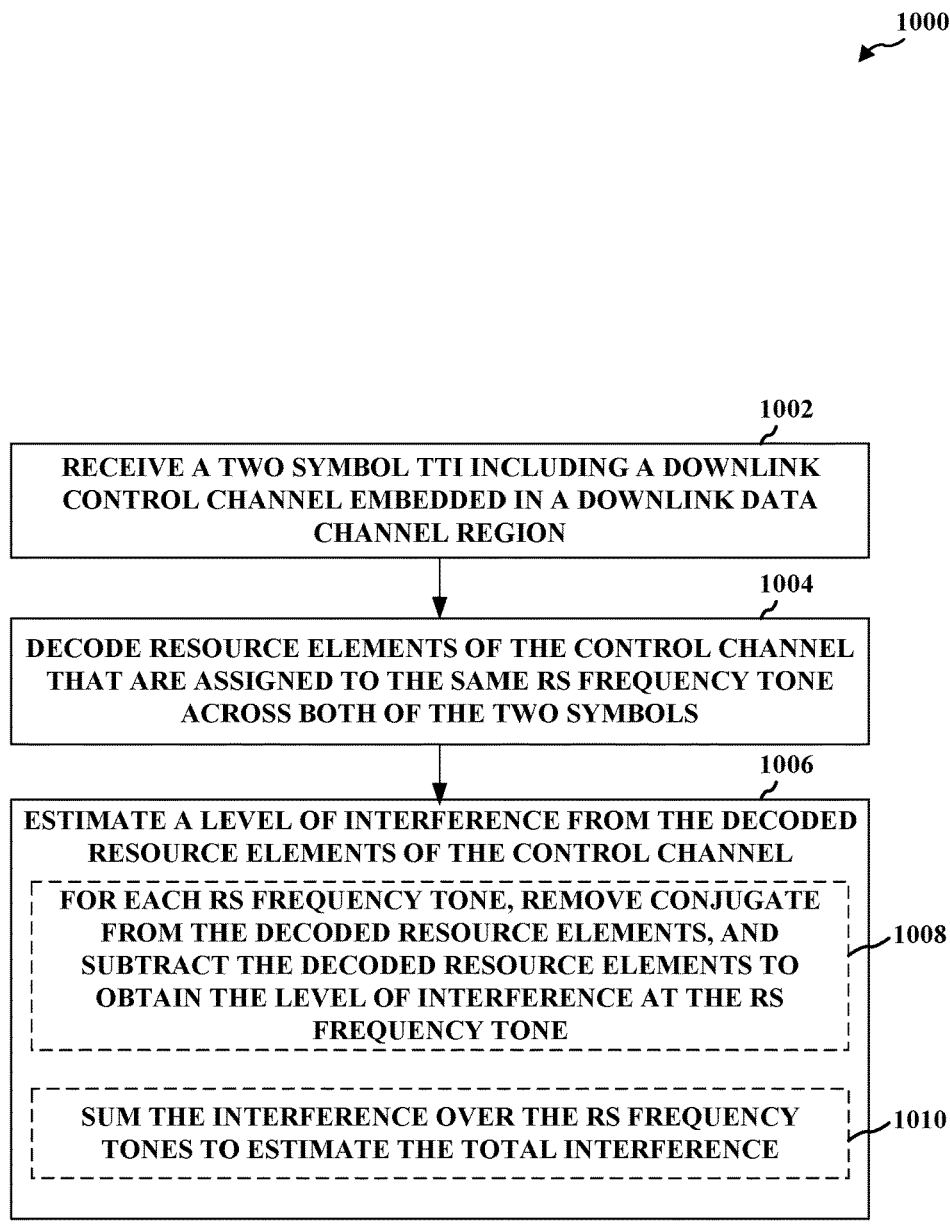
FIG. 10 is a flow chart of an example of a method for estimating a level of interference in accordance with aspects described herein.

FIG. 10 illustrates an example of a method 1000 for estimating interference from neighboring eNBs based on a downlink control channel being embedded in a downlink channel region in ULL. In an example, this may be performed alternatively to using CSI-IM. At Block 1002, the UE may receive a two symbol TTI including a downlink control channel embedded in a downlink data channel region. In an aspect, communicating component 361, e.g., in conjunction with processor(s) 503, memory 505, and/or transceiver 506, may receive a two symbol TTI including a downlink control channel (e.g., uPDCCH) embedded in a downlink data channel region (e.g., uPDSCH) from eNB 504. For example, in a ULL TTI, uPDCCH can be embedded in the same TTI as uPDSCH in one or more REs within the TTI. The REs for uPDCCH may be non-adjacent with uPDSCH REs in between. In addition, the REs for uPDCCH can be the same in both symbols of the two symbol TTI.

At Block 1004, the UE may decode REs of the control channel that are assigned to the same RS frequency tone across both of the two symbols. In an aspect, communicating component 361, e.g., in conjunction with processor(s) 503, memory 505, and/or transceiver 506, may decode REs of the control channel that are assigned to the same RS frequency tone across both of the two symbols. In this example, communicating component 361 can perform demodulating and/or decoding the embedded control signal within the TTI.

At Block 1006, the UE may optionally estimate a level of interference from the decoded resource elements of the control channel. In an aspect, interference detecting component 516, e.g., in conjunction with processor(s) 503, memory 505, and/or transceiver 506, may determine the level of interference from the decoded resource elements of the control channel within the TTI. This may be alternatively to using the null RS tones with CSI-IM described above, and thus CSI-IM overhead may be avoided.

For example, in estimating the level of interference at Block 1006, the UE may optionally, at Block 1008, for each RS frequency tone, remove conjugate from the decoded REs, and subtract the decoded REs to obtain the level of interference at the RS frequency tone. In an aspect, interference detecting component 516, e.g., in conjunction with processor(s) 503, memory 505, and/or transceiver 506, may for each RS frequency tone, remove conjugate from the decoded REs (e.g., based on obtaining a channel estimate of the REs), and subtract the decoded REs to obtain the level of interference at the RS frequency tone. In a specific example, given $C_1$ and $C_2$ uPDCCH resource elements assigned to a same frequency tone in consecutive TTIs, the uPDCCH can be decoded to formulate $\hat{C}_1$ and $\hat{C}_2$. Interference detecting component 516 can then apply the conjugate, multiple, subtract, and square to form a TTI noise estimate per RS frequency tone: $(\hat{C}_1^* C_1(h_1+n_1) - \hat{C}_2^* C_2(h_2+n_2))^2 \approx (n_1+n_2)^2$. In an example, interference detecting component 516 can additionally perform remodulating of the control signals to eliminate the control data resource elements (e.g., $C_1$ and $C_2$) and can perform subtracting the channel estimates to obtain the level of interference. To estimate the level of interference at Block 1006, the UE may optionally, at Block 1010, sum the interference over the RS frequency tones to estimate the total interference.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for determining a configuration of reference signal (RS) resources in wireless communications, comprising:
    receiving, from an access point, a scheduling grant of resources, wherein the scheduling grant indicates one or more parameters related to transmission locations of one or more RSs, wherein the scheduling grant indicates a process number corresponding to channel state information (CSI)-RS transmission;
    determining RS resource locations for the one or more RSs based at least in part on the one or more parameters, wherein determining the RS resource locations includes determining at least a transmission time interval (TTI) during which the CSI-RS is transmitted by the access point based at least in part on the process number; and
    receiving the one or more RSs over the RS resource locations, wherein receiving the one or more RSs includes receiving, from the access point, the CSI-RS during the TTI.

2. The method of claim 1, further comprising:
    generating one or more measurements of the CSI-RS;
    receiving an uplink scheduling grant for reporting CSI feedback for the CSI; and
    reporting the one or more measurements as the CSI feedback to the access point in a subsequent TTI based on the uplink scheduling grant.

3. The method of claim 2, wherein reporting the one or more measurements includes multiplexing the one or more measurements with data for transmitting over a channel corresponding to the uplink scheduling grant.

4. The method of claim 2, wherein reporting the one or more measurements includes transmitting the one or more measurements over a segment of a channel corresponding to the uplink scheduling grant.

5. The method of claim 4, wherein the uplink scheduling grant indicates an index of the segment.

6. The method of claim 1, further comprising determining a number of antenna ports corresponding to the process number, wherein the CSI-RS are received over the number of antenna ports.

7. The method of claim 6, further comprising determining one or more RS tones in frequency that correspond to the number of antenna ports, wherein the CSI-RS are received over the one or more RS tones.

8. The method of claim 7, wherein determining the one or more RS tones is based at least in part on whether a user equipment (UE)-RS is transmitted in the TTI.

9. The method of claim 1, wherein the scheduling grant further indicates whether a user equipment (UE)-RS is to be received in a transmission time interval (TTI), wherein determining the RS resource locations includes determining at least a transmission time interval (TTI) for receiving the UE-RS, and wherein receiving the one or more RS s includes receiving, from the access point, the UE-RS during the TTI.

10. The method of claim 9, wherein determining at least the TTI is based at least in part on the one or more parameters specified in the scheduling grant.

11. The method of claim 9, further comprising receiving, from the access point, a channel state information (CSI)-RS in the TTI.

12. The method of claim 1, further comprising reporting cell-specific reference signal (CRS) measurements to the access point, wherein the one or more parameters indicate RS frequency tones for the one or more RSs that are based on the CRS measurements.

13. The method of claim 1, wherein the scheduling grant further indicates whether channel state information (CSI)-interference management (IM) is enabled for a transmission time interval (TTI), and further comprising performing interference measurements or rate matching based on configured CSI-IM resource locations.

14. The method of claim 13, further comprising determining the configured CSI-IM resource locations based on receiving an indication of the configured CSI-IM resource locations within the TTI in a radio resource control (RRC) configuration.

15. The method of claim 1, further comprising determining a level of interference from one or more access points over multiple transmission time intervals (TTI) based at least in part on demodulating and decoding control signals within the multiple TTIs, obtaining channel estimates per each of the multiple TTIs based on remodulating the control signals to eliminate control data, and subtracting the channel estimates.

16. A method for specifying a configuration of resources for transmitting reference signals (RS) in wireless communications, comprising:
    generating a scheduling grant of resources for communicating with a user equipment (UE), wherein the scheduling grant indicates one or more parameters related to transmitting one or more RSs, and wherein the scheduling grant indicates a process number corresponding to channel state information (CSI)-RS transmission;
    transmitting the scheduling grant to the UE; and
    transmitting the one or more RSs over RS resources based at least in part on the one or more parameters, wherein transmitting the one or more RSs includes transmitting the CSI-RS during a transmission time interval (TTI) corresponding to the process number.

17. The method of claim 16, further comprising transmitting an uplink scheduling grant to the UE for transmitting CSI feedback.

18. The method of claim 17, further comprising receiving, from the UE in a subsequent TTI based on the uplink scheduling grant, CSI feedback corresponding to the CSI-RS.

19. The method of claim 18, wherein receiving the CSI feedback includes receiving the CSI feedback multiplexed with data over a channel corresponding to the uplink scheduling grant.

20. The method of claim 18, wherein the uplink scheduling grant indicates an index of a segment of the channel, where other segments are assigned to other UEs, and wherein receiving the CSI feedback includes receiving the CSI feedback in the segment of the channel.

21. The method of claim 16, wherein transmitting the CSI-RS includes transmitting the CSI-RS over a number of antenna ports corresponding to the process number.

22. The method of claim 21, further comprising signaling a plurality of process numbers and associated parameters to the UE using radio resource control (RRC) signaling), wherein transmitting the CSI-RS is based on the associated parameters for the process number.

23. The method of claim 21, wherein transmitting the CSI-RS includes transmitting the CSI-RS over a channel in frequency that corresponds to the number of antenna ports.

24. The method of claim 16, further comprising transmitting, to the UE, a user equipment (UE)-RS in the TTI.

25. The method of claim 16, further comprising:
receiving an estimate of a channel coherence bandwidth from the UE corresponding to a cell-specific reference signal (CRS) transmission; and
determining a number of frequency tones for the one or more RSs based at least in part on the estimate of the channel coherence bandwidth, wherein transmitting the one or more RS s is based on the number of frequency tones.

26. The method of claim 16, wherein the scheduling grant indicates whether channel state information (CSI)-interference management (IM) is enabled for a transmission time interval (TTI).

27. An apparatus for wireless communications, comprising:
a transceiver for communicating one or more wireless signals via one or more antennas;
a memory configured to store instructions; and
one or more processors communicatively coupled with the transceiver and the memory, wherein the transceiver is configured to:
receive, from an access point, a scheduling grant of resources, wherein the scheduling grant indicates one or more parameters related to transmission locations of one or more reference signals (RS), wherein the scheduling grant indicates a process number corresponding to channel state information (CSI)-RS transmission;
wherein the one or more processors are configured to:
determine RS resource locations for the one or more RSs based at least in part on the one or more parameters, wherein the one or more processors are further configured to determine at least a transmission time interval (TTI) during which the CSI-RS is transmitted by the access point based at least in part on the process number; and
wherein the transceiver is further configured to:
receive the one or more RSs over the RS resource locations, wherein the transceiver is further configured to receive, from the access point, the CSI-RS during the TTI.

28. An apparatus for wireless communications, comprising:
a transceiver for communicating one or more wireless signals via one or more antennas;
a memory configured to store instructions; and
one or more processors communicatively coupled with the transceiver and the memory, wherein the one or more processors are configured to:
generate a scheduling grant of resources for communicating with a user equipment (UE), wherein the scheduling grant indicates one or more parameters related to communicating one or more reference signals (RS), and wherein the scheduling grant indicates a process number corresponding to channel state information (CSI)-RS transmission; and
wherein the transceiver is configured to:
transmit the scheduling grant to the UE; and
transmit the one or more RSs over RS resources based at least in part on the one or more parameters, wherein the CSI-RS are transmitted during a transmission time interval (TTI) corresponding to the process number.

* * * * *